Nov. 12, 1957 T. P. ROHDE 2,812,865
FEED SCOOP FOR ROTARY DRUMS OR KILNS
Filed March 16, 1955
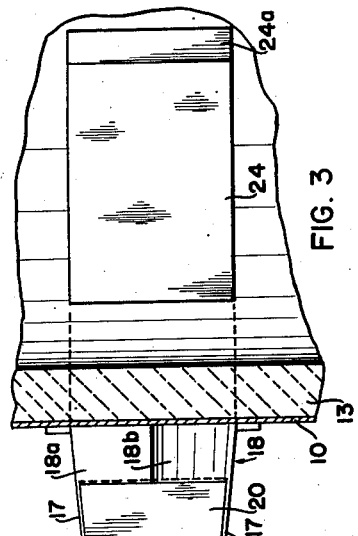
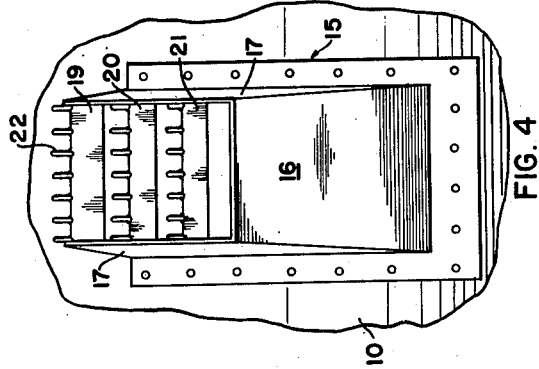
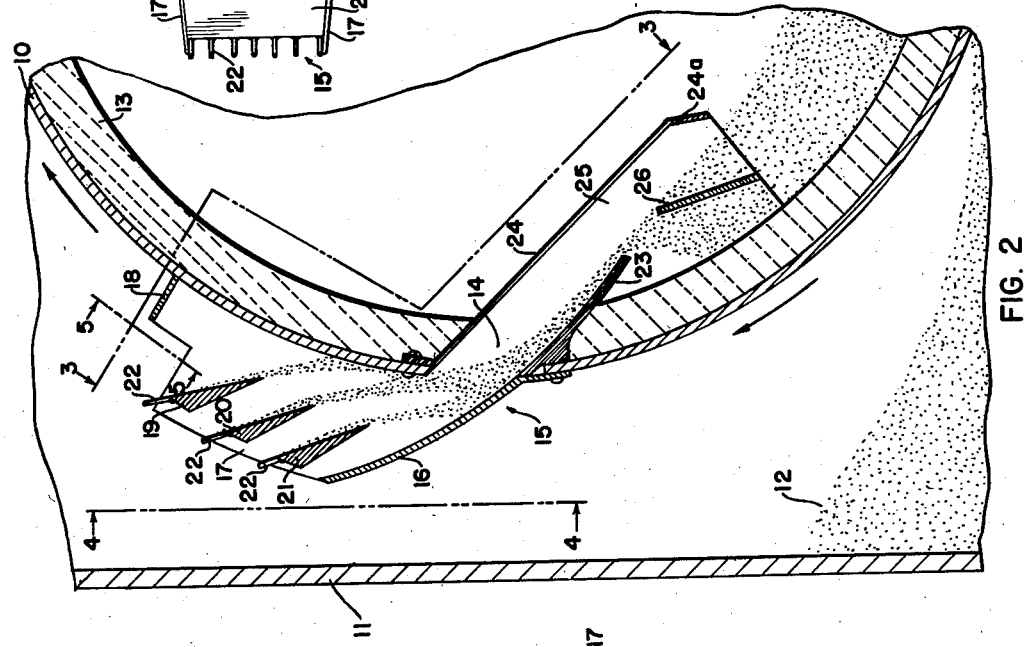
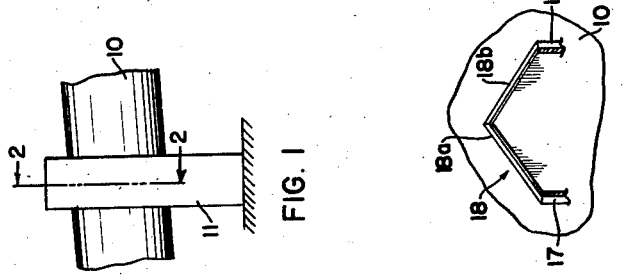
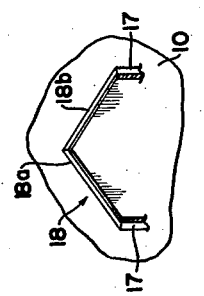
INVENTOR
Hyge Preisler Rohde
BY
Pennie Edmonds Morton Barrows Taylor
ATTORNEYS

United States Patent Office 2,812,865
Patented Nov. 12, 1957

2,812,865

FEED SCOOP FOR ROTARY DRUMS OR KILNS

Thyge Preisler Rohde, Copenhagen, Denmark, assignor to F. L. Smidth & Co., New York, N. Y., a corporation of New Jersey Application March 16, 1955, Serial No. 494,730

Claims priority, application Denmark March 20, 1954

9 Claims. (Cl. 214—18)

This invention relates to rotary drums, such as rotary kilns and similar vessels of generally cylindrical shape rotatable on their longitudinal axes, and is concerned more particularly with a novel scoop mountable on the outside of such a rotary drum and operable, as the drum rotates, to introduce material into the interior of the drum through an opening through the drum wall.

It is now known practice to introduce material into a rotary drum during the rotation thereof by providing one or more openings through the wall of the drum and mounting a scoop on the outside of the drum at each opening. The zone of the drum with the openings is enclosed within a stationary jacket, in which a supply of the material is maintained, and, as each scoop passes through the pile of material, it picks up a quantity thereof and conducts it to the opening. Within the drum at each opening is a continuation of the scoop, which directs the material entering the drum to the charge and prevents escape of material outwardly through the opening, when the part of the drum with the opening is traveling through the bottom arc of the drum. While scoops of the kind described are in common use, those of present construction are subject to the disadvantage that the exterior part of such a scoop is liable to clog temporarily and then to discharge suddenly. As a result, the interior continuation of the scoop may be plugged with the sudden flood of material, so that the scoop is put out of action, or else the continuation may be clogged long enough to retain the material and discharge it when the scoop is near the top of the drum, so that the material falls through the free space within the drum above the charge with resultant undesirable formation of dust.

The scoop of the present invention is superior to those used heretofore, in that the new scoop is so constructed that the material is picked up from the pile in a number of successive thin layers and the material thus broken up is conducted to the drum opening through passages of increasing cross-sectional area. The layers are cut from the pile by spaced blades so that the material traveling toward the opening is distributed among the passages and the liability of clogging in the exterior part of the scoop is thereby reduced. The outer edges of the blades are preferably provided with outwardly projecting teeth, which loosen up the material in the pile before the material is picked up. The continuation of the scoop within the drum conducts the material some distance inwardly from the drum shell before releasing it, and the material being so conducted is subdivided by a blade, so that the stream of material is further broken up and clogging prevented.

For a better understanding of the invention, reference may be made to the accompanying drawing in which Fig. 1 is a fragmentary view in side elevation showing part of a rotary kiln with the jacket, in which the new scoop operates;

Fig. 2 is a sectional view of the line 2—2 of Fig. 1; and

Figs. 3, 4, and 5 are sectional views on the lines 3—3, 4—4, and 5—5 of Fig. 2, respectively.

The new scoop is illustrated in the drawing mounted on the outside of a rotary kiln 10 and lying within a stationary jacket 11, which encircles the kiln and is supplied in any convenient manner with material 12, which is to be introduced into the kiln. The kiln has the usual fire brick lining 13 and it is formed with an opening 14 through its shell and lining, through which material picked up by the scoop 15 is introduced into the interior of the kiln.

The scoop has an exterior part comprising a bottom wall 16 secured to the outside of the shell in line with the trailing edge of opening 14, that is, the edge of the opening to the rear as the kiln rotates, and a pair of side walls 17 are connected to the side edges of the bottom wall. The ends of the side walls remote from the bottom wall are partially connected by a deflector 18, which extends outwardly from the kiln shell and is made up of walls 18a, 18b meeting at an angle midway between walls 17. The side walls 17 are connected by a plurality of like blades 19, 20, 21, which lie with their outer edges at increasing distances from the axis of rotation of the drum starting with blade 19. The blades lie at angles to radii of the drum and in non-parallel relation to one another. The blades taper in thickness from their outer toward their inner edges with the result that adjacent blades define passages which are of increasing cross-sectional area toward the inner edges of the blades. Each blade is provided with a plurality of spaced teeth 22 projecting outwardly from its outer edge.

Within the kiln, the scoop has a plate 23 serving as a continuation of the bottom wall 16 of the external part of the scoop, and a cover plate or front wall 24, which projects inwardly in line with the leading edge of opening 14 and is of a width equal to the width of the opening. A pair of side walls 25 extend from the side edges of front wall 24 to the kiln lining and a blade 26 is mounted between walls 25 and lies at an angle to a radius of the kiln. At its inner edge, the wall 24 has a section 24a lying at an angle to the remainder of the wall and directed toward the kiln lining adjacent the inner end of the scoop.

As shown in Fig. 3, the projection of wall 16 on a plane is trapezoidal in form with the longest dimension at the shell of the kiln. As a result, the space through which the material travels after being picked up by the blades and the bottom wall 16 of the scoop, gradually increases in cross-sectional area toward the opening 14 and this insures free travel of the material. As the kiln rotates, the blades 19, 20, and 21 lying with their outer edges at successively increasing distances from the axis of rotation of the kiln pick up successive layers of material from the pile and discharge the material successively, as the forward surfaces of the blades reach the angle of repose of the material at successive instants. The amount of material picked up by blade 19 is limited by the action of the deflector 18 so that an excessive quantity of material cannot be taken up by blade 19 with possible resultant clogging. As each blade moves through the material, the teeth 22 thereon loosen and break up lumps of material so that the material when picked up by the blades will flow freely.

The material entering the kiln through the opening 14 slides along the bottom wall 16 and plate 23 to be discharged off the inner end of the plate during the movement of the scoop through the arc of rising travel of the kiln. The material passing off plate 23 is subdivided by blade 26, so that any tendency toward clogging within the internal part of the scoop is avoided. As the rotation of the kiln continues, the walls forming the interior part of the scoop act to prevent any of the discharge from issuing through opening 14.

The new scoop is simple in construction and functions satisfactorily with material of various kinds by reason of the pick up of the material at successive stages by the blades, the limitation by the deflector of the amount of material picked up by the first blade, and the provision of passages of gradually increasing cross-sectional area for the travel of the material toward the opening through the kiln wall. The external part of the scoop is thus kept from being overloaded with the result that total clogging or partial clogging with a discharge of the material through the free space of the kiln is prevented.

I claim:

1. The combination with a rotary drum having an opening through its curved wall of a scoop mounted on the outer surface of the drum wall at the opening and having a bottom wall extending outwardly from the trailing edge of the opening, side walls connected to the side edges of the bottom wall and extending forwardly from the sides of the bottom wall and converging in a direction away from the opening, and a plurality of blades mounted between the side walls at angles to radii of the drum and spaced from the drum.

2. The combination of claim 1, in which the outer edges of the blades lie at increasing distances from the axis of rotation of the drum from the forward blade toward the rear.

3. The combination of claim 1, in which the blades are shaped to define passages between them, which increase in cross-section toward the opening.

4. The combination of claim 1, in which the forward faces of the blades lie in non-parallel relation.

5. The combination of claim 1, in which the blades are provided with teeth projecting outwardly from their outer edges.

6. The combination of claim 1, in which a deflector is mounted on the drum ahead of the first blade of the group and deflects material away from the inner edges of the blades.

7. The combination of claim 1, in which the bottom and side walls have continuations within the drum with the side walls extending inwardly beyond the bottom wall, a cover plate connects the side walls within the drum and lies spaced from the bottom wall, and a blade is mounted between the side walls within the drum.

8. The combination of claim 7, in which the outer edge of the blade within the drum is spaced from the inner edge of the continuation of the bottom wall.

9. The combination with a rotary drum having an opening through its curved wall of a scoop mounted on the drum at the opening and having a bottom wall which extends outwardly from the trailing edge of the opening and has a continuation within the drum, side walls connected to the side edges of the bottom wall and extending forwardly from the sides of the bottom wall and converging in a direction away from the opening, the side walls having continuations passing through the opening and connected within the drum to the continuation of the bottom wall, a cover plate connecting the side walls within the drum and lying spaced from the bottom wall, and at least one blade mounted between the side walls in the path of material traveling through the space between the side walls.

References Cited in the file of this patent

UNITED STATES PATENTS

| | | |
|---|---|---|
| 2,002,972 | Avnsoe | May 28, 1935 |
| 2,153,385 | Minogue | Apr. 4, 1939 |